United States Patent Office 3,570,127
Patented Mar. 16, 1971

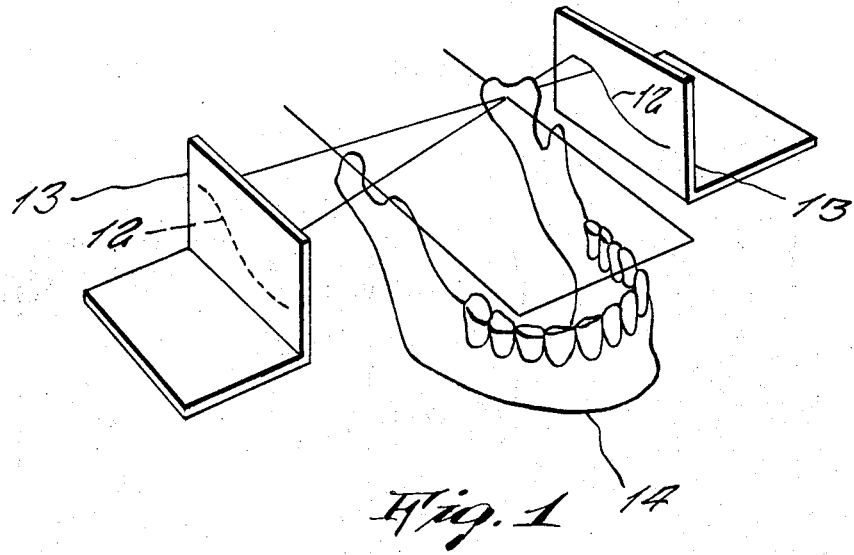
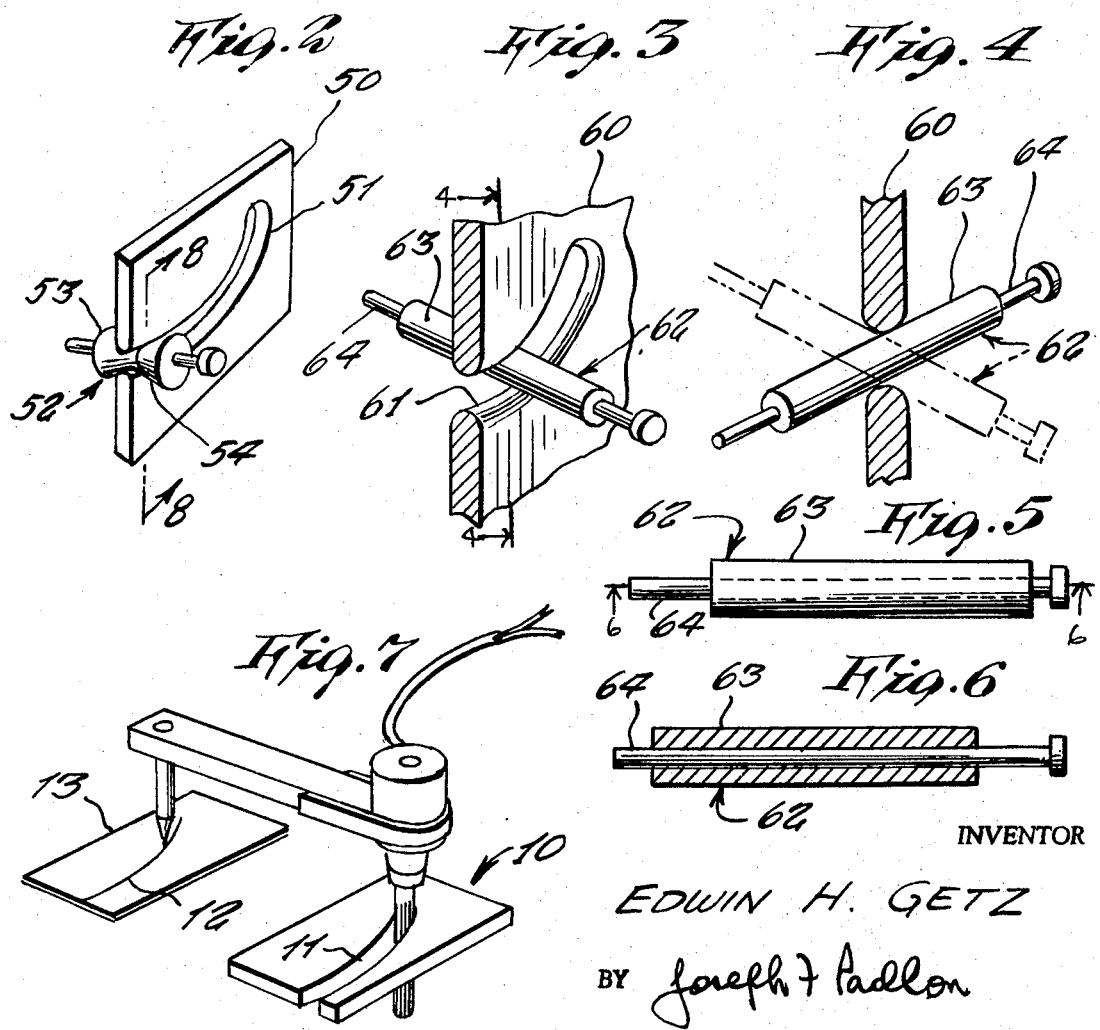

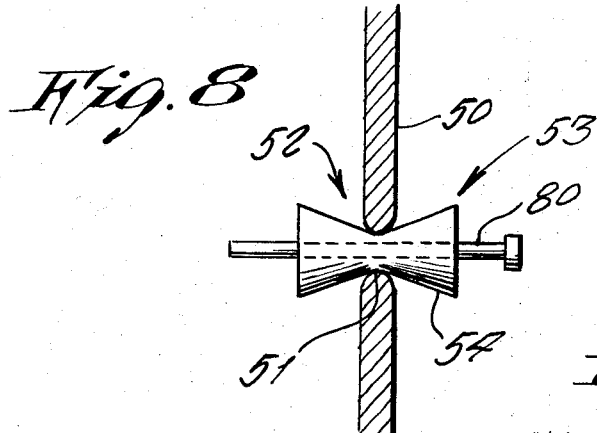
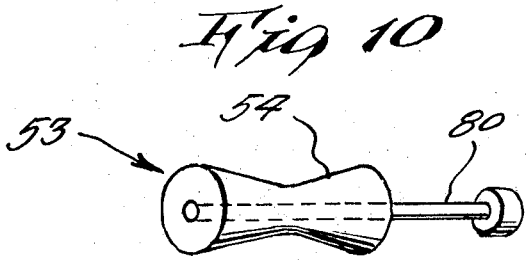
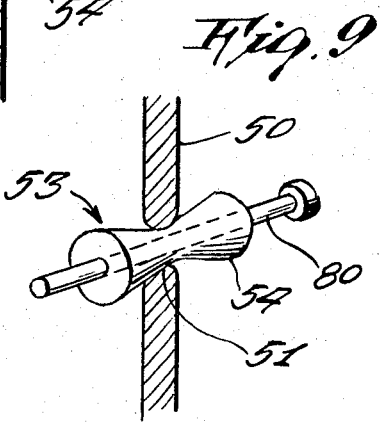
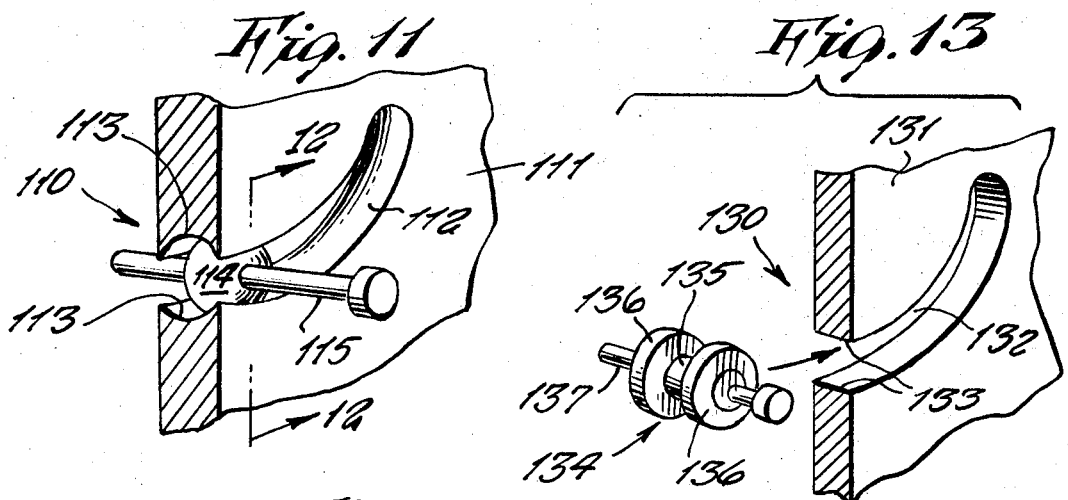
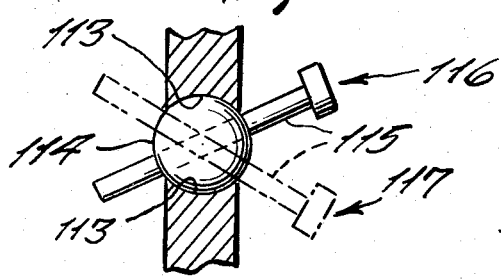

3,570,127
CUT PATH DENTAL ARTICULATOR
Edwin H. Getz, 60 Olive Place,
Forest Hills, N.Y. 11375
Filed Nov. 27, 1968, Ser. No. 779,391
Int. Cl. A61c *11/00*
U.S. Cl. 32—32                                        1 Claim

ABSTRACT OF THE DISCLOSURE

A dental articulator which is able to simulate all the movements of a human jaw, the articulator incorporating metal or plastic cut-path guides which are originally obtained by a transfer method from tracings taken directly from the jaw movements of a patient by pantograph means.

---

This invention relates generally to dental articulators, and more specifically to that type of dental articulators which are capable of simulating all of the jaw movements of a human being.

It is generally well known to those skilled in the art, that tracings are made by a pantograph device that scribes the paths of centers of rotation of the mandible, the tracing being made in three dimensions simultaneously, and while they could be made in any three planes at right angles to each other, are usually made in certain areas for convenience and facility. The writing apparatus must be rigidly attached to the maxilla and mandible of the patient by aluminum castings cemented over the teeth. The maxillary or fixed upper member carries the blanks for the tracings which may be comprised of paper, glass, plastic or the like; and the mandibular or lower movable member carries the styli or tracing points. The tracing setups or pairs thereof, comprised of tracing-receiving blank and stylus, are placed in three or more areas. Two at right angles to each other are placed external to each tempromandibular joint area, and one or two tracing pairs are placed along the occlusal plane of the teeth, externally on the frames to the front of the jaws, either at mid-line or to each side, and in this area the tracing blanks are carried on the mandibular frame and the styli are carried on the maxillary frame.

As the mandible moves, the styli makes linear marks on the tracing blanks, recording the particular jaw movements of the patient. The blanks may comprise paper marked by a sharp pencil stylus, wax coated glass etched by a sharp metal point stylus, or some other mechanical or possibly electronic device that makes a visual, chemical or electronic record of the styli movements, and thus the jaw movements.

The recording apparatus is now temporarily mounted on an articulator, the device being a highly adjustable mechanical representation of a patient's related jaws so to receive casts of upper and lower teeth. The styli are now made to follow the tracings, causing the attached tracing bow to move the movable member of the articulator in relation to the fixed member of the articulator. Mechanical adjustments are made on the articulator so that the movement is the same as dictated by the tracings and will remain in the same position after the tracing frames (comprised of upper and lower bows with tracings and styli) are removed from the articulator. Thus the casts on the articulator are made to move in relation to each other as dictated by the articulator adjustments, which have been determined by the tracing apparatus which makes the styli follow the tracings, the tracings having been made on the patient himself with the tracing apparatus. The final result is that the casts of the patient's teeth are guided to move in relation to each other on the articulator in exactly the same manner as the patient's teeth (from which the casts have been made) and they accordingly may move in like relation to each other. There are now no tracings on the articulator, they having been used to make adjustments on the articulator and having now been removed.

In the present invention, the method of imparting movement to the articulator which will be characteristic of a given patient differs from that of the above. Tracings are made in a traditional or new manner, mechanical, chemical or electronic, but at this point, the method proceeds differently by requiring the making of a new type record, perhaps to be known as a cut-path guide which is to be used on an entirely new concept of articulator and thus possibly termed a cut-path articulator. The linear tracings on the several tracing blanks will be converted to a similar blank in metal or plastic in which the tracing lines will be replaced by a cut channel through the blank, thus providing the name: cut blank guide. The articulator, instead of having a wide variety of adjustments, as conventionally known articulators, will receive on the fixed member, carrying the cast that will remain stationary, the metal cut-path guides which will be attached to and become a part of the articulator.

A principal object of the present invention is to provide a method for taking the tracings (extra-oral or otherwise) and converting them for use directly as mechanical guides, so to replace the present multiple adjustments such as are necessary on conventional gnatholators and articulators.

Another object is to provide a cut-path dental articulator having guidance means so to produce absolute fidelity in the mechanical response of the articulator to any set of tracings or pictoral records in the form of mandibular movement records.

Another object is to provide a cut-path dental articulator which eliminates the tedious, lengthy and complicated system now employed as the general principle on all so-called fully adjustable articulators wherein adjustable mechanical guides are set so that the movable element of the articulator will approximate in movement the paths scribed on the tracings, but wherein the system has the inherent fault that adjustable guides rarely can be 100 percent faithfully accurate to the records.

Another object is to provide a cut-path dental articulator which can be quickly setup to faithfully reproduce in accurate movement any set of tracings, and which is made possible by using blank forms of standard shape and size made of metal, plastic, or the like, which can, in addition to receiving the tracing record, be accurately cut and milled.

Another object is to provide a cut-path dental articulator which will eliminate numerical value adjustments of present articulators.

Other objects are to provide a cut-path dental articulator which is simple in design, inexpensive to manufacture, rugged in construction, easy to use and efficient in operation.

These and other objects will be readily apparent upon a study of the following specification and the accompanying drawing wherein:

FIG. 1 is a perspective view of a setup for establishing a tracing;

FIG. 2 is a perspective view of a cut-path guide;

FIG. 3 is a fragmentary perspective view showing a modified form thereof;

FIG. 4 is a cross-sectional view taken on line 4—4 of FIG. 3;

FIG. 5 is a side view of a tracking element used in FIG. 3;

FIG. 6 is a cross sectional view thereof as viewed on line 6—6 of FIG. 5;

FIG. 7 is a perspective view showing diagrammatically the transfer of a tracing line from a tracing to a cut-path guide;

FIG. 8 is a cross-sectional view taken on line 8—8 of FIG. 2;

FIG. 9 is a view similar thereto showing the roller in an askew position;

FIG. 10 is a perspective view of the roller shown per se;

FIG. 11 is a fragmentary perspective view showing a further modified form of cut-path guide;

FIG. 12 is a cross-sectional view taken on line 12—12 of FIG. 11; and

FIG. 13 is a fragmentary perspective view showing a yet further modified form of cut-path guide.

Referring now to the drawing in detail, the reference numeral 10 represents a cut-path dental articulator guide according to the present invention which is removably securable to an articulator to form a cut-path dental articulator having the above advantageous characteristics.

The guide 10 is comprised from a flat metal or plastic blank into which a configurated slot 11 is milled. The slot is a machined identical reproduction of the contour of a scribed line 12 made upon a tracing member 13 which may be made of paper, wax-coated glass, plastic or other member wherein the line 12 lacks the permanency of the milled slot in metal. The scribed line in the tracing is made by a stylus according to the movements of a human jaw 14 in a particular plane, as above described, and as is diagrammatically shown in FIG. 1 of the drawing.

In FIG. 2 the guide 50 has a slot 51 with V-shaped edges between which is received a tracking element 52 comprising a roller 53 having correspondingly V-shaped annular groove 54 to receive the slot edges.

In FIGS. 3 through 6, the guide 60 has a slot 61 with rounded edges between which a tracking element 62 is received which comprised a tubular sleeve 63 pivotable about and slidable longitudinally about a spindle 64. The rounded edges of the slot permit varied angular positions as is indicated in FIG. 7.

As shown in FIGS. 8 through 10, the roller 53 is mounted rotatably free upon a spindle 80 which extends through the roller upon the same axis thereof.

In FIGS. 11 and 12, a modified form of cutpath guide 110 is shown wherein there is a guide 111 having a slot 112, the slot having upper and lower edges 113 each of which is transversely concave in configuration. A spherically configurated roller 114 is seated within the concave edges and is held captive therebetween while being slidable along the slot. A spindle 115 extends transversely through the roller, the spindle and roller being laterally pivotable between the positions 116 and 117 illustrated in FIG. 12.

In FIG. 13, a yet further modified form of cut-path guide 130 is shown to include a guide 131 with a slot 132 having opposite side edges 133 which are straight and parallel to each other in a transverse direction.

A roller 134 receivable in the slot 132 includes a cylindrical section 135 between enlarged flanges 136 formed integral therewith. The roller is mounted upon spindle 137 extending axially therethrough.

In operative use, the cut-path guides are secured to one frame or member of the articulator and the tracking elements that engage the guides are secured to the other frame or member. A single tracking element can engage a single cut-path guide, or the cut-path guides can be mounted in pairs at approximately right angles to each other, in different planes, to be engaged by pairs of tracking elements. Choice of the number of cut-path guides, their position in relation to certain points or areas of the articulator frame, and whether they are on the fixed or movable member of the articulator is arbitrary. When engaged, the tracking elements riding in the slots of the cut-path guides may thus be moved singly and in pairs. Groups of pairs may be arranged suitably in posterior and anterior areas so that as all the tracking elements and guides engage, movement in two or more planes will be imparted to the movable member of the articulator.

Thus the cut path articulator guide comprises a permanent record for a patient; the guide being easily and quickly mountable and dismountable from an articulator.

While various changes may be made in the detailed construction, it is understood that such changes will be within the spirit and scope of the present invention as is defined by the appended claim.

I claim:

1. A device for reproducing the mandibular and maxillary movements of a dental patient's jaws for comparative use in preparing dentures therefrom, comprising means for attachment to the mandible and maxilla of a patient to trace the lateral, vertical and compound movements thereof, indicator means on said means, plate means contacted by said tracing means for receiving scribes thereon showing said movements, plate means spaced from and corresponding with said first named means, pantographic means adapted to follow the scribes from said latter plates, and having cutting means thereon for forming a slot or groove in said last named plates corresponding with the scribes on the second plates, and dental articular means in connection with said last plates to form corresponding denture configuration in said articular means.

References Cited

UNITED STATES PATENTS 1,586,739   6/1926   Hanau                 32—32

ROBERT PESHOCK, Primary Examiner